W. V. TURNER.
EMERGENCY BRAKE DEVICE.
APPLICATION FILED APR. 17, 1915.
1,199,839.
Patented Oct. 3, 1916.
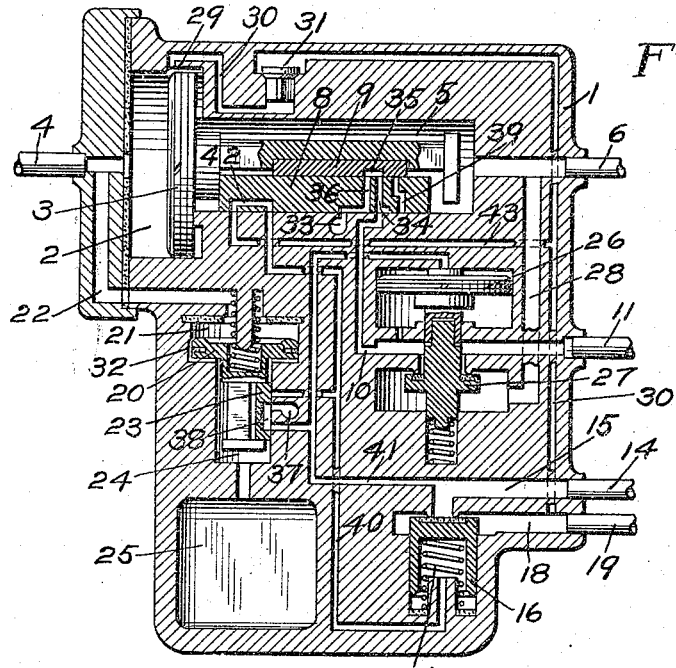
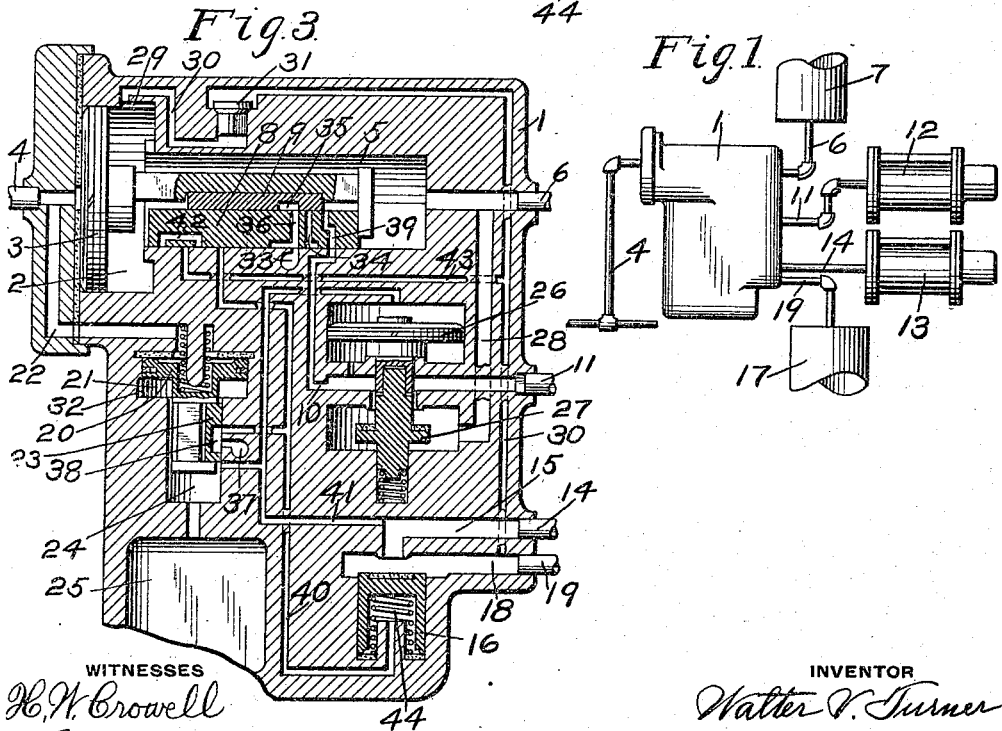
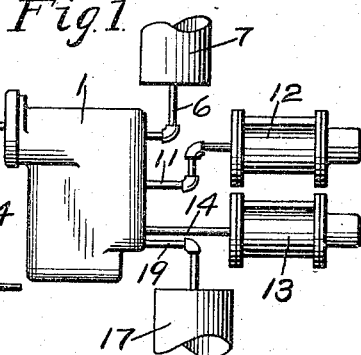

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

EMERGENCY BRAKE DEVICE.

1,199,839.  Specification of Letters Patent.  Patented Oct. 3, 1916.

Application filed April 17, 1915. Serial No. 21,977.

*To all whom it may concern:*

Be it known that I, WALTER V. TURNER, a citizen of the United States, residing at Edgewood, in the county of Allegheny and State of Pennsylvania, have invented new and useful Improvements in Emergency Brake Devices, of which the following is a specification.

This invention relates to fluid pressure brakes, and more particularly to a brake apparatus for securing a high braking power in an emergency application of the brakes.

The principal object of the invention is to provide an improved brake controlling valve device adapted for supplying fluid to one brake cylinder in service applications of the brakes and to two brake cylinders in an emergency application of the brakes.

In the accompanying drawing; Figure 1 is a diagrammatic view of a car air brake equipment employing two brake cylinders and showing the improved brake controlling valve device connected up; Fig. 2 a central sectional view of the brake controlling valve device, with the parts in normal release position; and Fig. 3 a similar view, showing the parts in emergency application position.

The brake controlling valve device may comprise a casing 1 having a piston chamber 2 containing a piston 3 and connected to brake pipe 4, and a valve chamber 5 connected by pipe 6 with an auxiliary reservoir 7 and containing a main slide valve 8 and graduating slide valve 9.

A restricted passage 10 leads from the seat of the main slide valve and communicates with pipe 11, opening into the service brake cylinder 12, said passage providing communication through which fluid is supplied to the service brake cylinder in a service application of the brakes.

The emergency brake cylinder 13 is connected by a pipe 14 with a passage 15 and a valve piston 16 is provided for controlling the admission of fluid from a supplemental reservoir 17 to the brake cylinder, the valve piston 16 being adapted to control communication from passage 18 leading to supplemental reservoir pipe 19, to passage 15.

The valve piston 16 is controlled by an emergency valve mechanism comprising a piston 20 contained in piston chamber 21, open through passage 22 to the brake pipe, and a valve 23, contained in valve chamber 24, which may be connected to a chamber 25, for increasing the volume of the valve chamber.

According to my invention, fluid is supplied to the service brake cylinder through a restricted passage in a service application of the brakes, while in an emergency application of the brakes, a large direct communication is opened for quickly supplying fluid to the service brake cylinder. For this purpose a piston 26 is provided for operating a valve 27 adapted to control a large port opening from passage 28, leading to the auxiliary reservoir 7.

In operation, fluid under pressure, supplied to the brake pipe 4, flows from piston chamber 2, through the usual feed groove 29 around the piston 3, and charges valve chamber 5 and the auxiliary reservoir 7. Fluid also flows through passage 30, containing check valve 31, and charges the supplemental reservoir 17. The emergency valve chamber 24 and the connected chamber 25 are charged from the brake pipe through feed groove 32 around emergency piston 20. In the normal release position of the parts, as shown in Fig. 2, the service brake cylinder 12 is connected to exhaust port 33 through passage 10, port 34, cavity 35 in graduating valve 9, and port 36. The emergency brake cylinder 13 is connected to an exhaust port 37, through passage 15 and cavity 38 in the emergency slide valve 23.

If a service application of the brakes is desired, a gradual reduction in brake pipe pressure is effected, and since the equalizing valve device is of the type adapted to make full traverse in both service and emergency application of the brakes, the piston 3 is then shifted to its outer seat and the service port 39 is brought into registry with passage 10. Fluid is therefore supplied from the auxiliary reservoir to the service brake cylinder through the restricted passage 10, the emergency parts not moving. Upon a sudden reduction in brake pipe pressure, the equalizing piston moves to application position as in service and in addition the emergency piston 20 moves out by reason of the reduction in brake pipe pressure at a greater rate than equalization can take place through the feed groove 32. In emergency position, as shown in Fig. 3 of the drawing, a passage 40 is connected by cavity 38, in the emergency valve 23, with exhaust port 37, so that fluid under pressure below the valve piston 16 is vented to the atmosphere and this permits supplemental reservoir pressure acting on the exposed portion of the area of the valve piston, to lift same from its seat and thus establish communication from the supplemental reservoir to the emergency brake cylinder 13. Fluid supplied from the supplemental reservoir to the emergency brake cylinder also flows through passage 41 to the chamber above piston 26 and said piston is thereupon shifted so as to open the valve 27 and provide a large direct communication for supplying fluid from the auxiliary reservoir to the service brake cylinder 12. It will thus be seen that in an emergency application of the brakes, fluid from the auxiliary reservoir rapidly equalizes into the service brake cylinder, so that the full equalized pressure is quickly secured in both brake cylinders.

In releasing after an emergency application, the brake pipe pressure is increased, so that the equalizing piston 3 is shifted to release position and the slide valves 8 and 9 are operated thereby to connect the service brake cylinder with the exhaust port 33. In order to insure the prompt, positive movement of the valve piston 16 to its closed position, the passage 40 is connected by a cavity 42, in the main slide valve 8, with a passage 43 leading to passage 30, so that fluid from the supplemental reservoir is supplied to the spring side of the valve piston 16. The consequent equalization of fluid pressures upon opposite sides of the valve piston, permits the spring 44 to move same to the closed position.

In order to facilitate the release movement of the emergency valve mechanism, the valve chamber 24 is connected in the emergency position with passage 41, so that the pressure in said valve chamber will then reduce to the equalized pressure in the emergency brake cylinder. The brake pipe pressure may then be readily increased to a higher degree than that acting in valve chamber 24 and consequently the emergency piston 20 is promptly shifted to release position. In release position of the emergency valve 23, the emergency brake cylinder 13 is connected to the exhaust port 37 and also the chamber above the piston 26, so that said piston and the valve 27 are shifted to the normal closed position.

Having now described my invention, what I claim as new and desire to secure by Letters Patent, is:

1. In a fluid pressure brake, the combination with a brake cylinder and means for supplying fluid to said brake cylinder to effect a service application of the brakes, of an emergency brake cylinder and a valve device operated by the flow of fluid to the emergency brake cylinder for supplying fluid to the service brake cylinder.

2. In a fluid pressure brake, the combination with a brake cylinder and means for supplying fluid to said brake cylinder to effect a service application of the brakes, of an emergency brake cylinder and a valve device operated by the flow of fluid to the emergency brake cylinder for opening a large direct communication for supplying fluid to the service brake cylinder.

3. In a fluid pressure brake, the combination with a brake cylinder, brake pipe, and a valve device operated upon a gradual reduction in brake pipe pressure for supplying fluid to said brake cylinder to effect a service application of the brakes, of an emergency brake cylinder, an emergency valve mechanism operated upon a sudden reduction in brake pipe pressure for effecting the supply of fluid to the emergency brake cylinder, and means operated by fluid supplied to the emergency brake cylinder for opening a large direct port for supplying fluid to the service brake cylinder.

4. In a fluid pressure brake, the combination with a brake cylinder, brake pipe, auxiliary reservoir, and triple valve device operated upon a gradual reduction in brake pipe pressure for supplying fluid through a restricted port from the auxiliary reservoir to the brake cylinder, of a supplemental reservoir, an emergency brake cylinder, an emergency valve mechanism operating upon a sudden reduction in brake pipe pressure for effecting the admission of fluid from the supplemental reservoir to the emergency brake cylinder, and a piston and valve operated by the flow of fluid to the emergency brake cylinder for opening a large port for supplying fluid to the service brake cylinder.

5. In a fluid pressure brake, the combination with a service brake cylinder and a triple valve device for controlling the admission of fluid to said brake cylinder in a service application of the brakes, of an emergency brake cylinder, an emergency valve mechanism for controlling the supply of fluid to the emergency brake cylinder, and means subject to the pressure in the emergency brake cylinder for controlling the admission of fluid to the service brake cylinder in an emergency application of the brakes.

In testimony whereof I have hereunto set my hand.

WALTER V. TURNER.

Witnesses:
A. M. CLEMENTS,
S. W. KEEFER.